United States Patent Office.

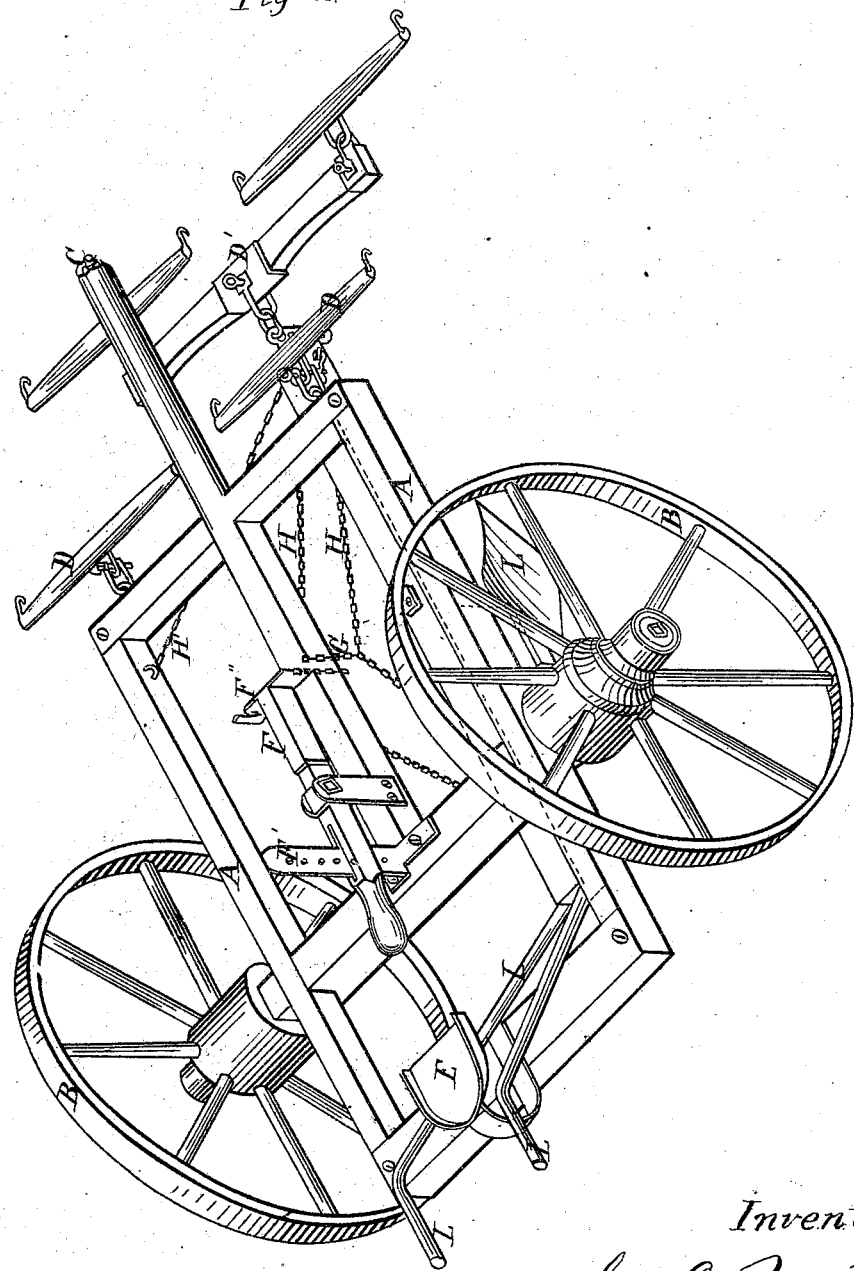

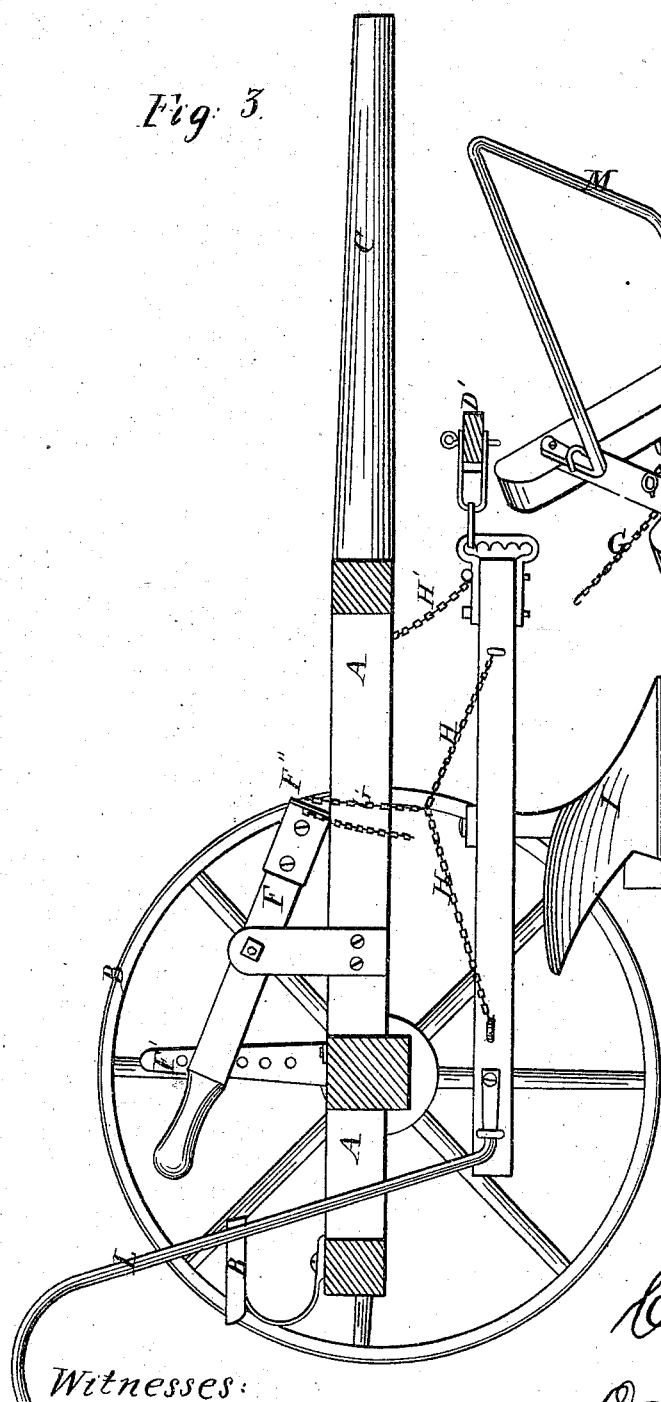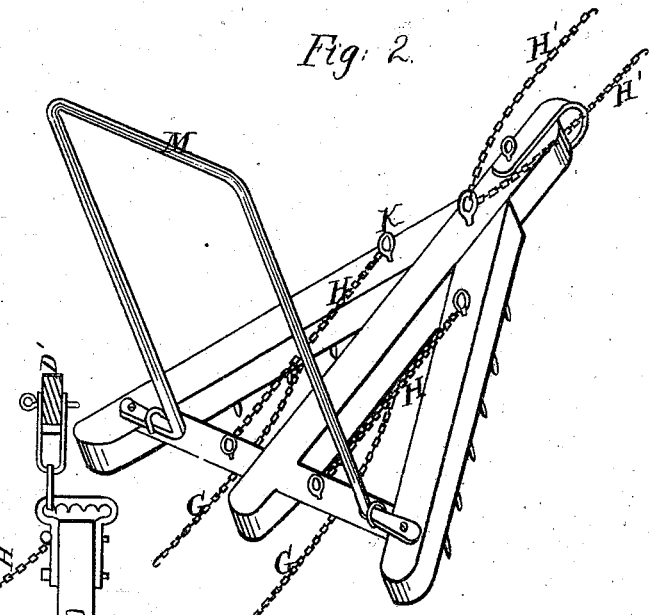

CAMPBELL N. BAKEWELL, OF NORMAL, ILLINOIS.

Letters Patent No. 75,832, dated March 24, 1868.

---

IMPROVEMENT IN SULKY-PLOUGH AND HARROW.

---

The Schedule referred to in these Letters Patent and making part of the same.

---

TO ALL WHOM IT MAY CONCERN:

Be it known that I, CAMPBELL N. BAKEWELL, of Normal, in the county of McLean, and State of Illinois, have invented a new and useful Improvement in Sulky-Ploughs and Harrows; and I do hereby declare that the following is a full, clear, and exact description of the same, reference being had to the annexed drawings, making part of this specification, in which—

Figure 1 is a persective view of the sulky.

Figure 2 is a perspective view of the harrow.

Figure 3 is a vertical longitudinal section of the sulky and plough attached.

The same letters, in all the figures, indicate the same parts.

My improvement consists in the mode of attaching a plough or harrow to a frame running upon two wheels, by means of chains attached to a lever, by which the implements attached thereto may be elevated or lowered.

A is the frame, carried upon two wheels, B B, and C is the tongue, fastened to the axle. Whiffle-trees, D D, are attached to the front of the frame, as shown, and a double-tree, D', is attached to the clevis of the plough or harrow. The horses are attached, both to the frame and to the plough, &c., by a double set of traces.

The driver sits upon the seat E, and in front of him is a lever, F, the fulcrum of which is formed by standards fastened to the tongue. The standard F', erected on the axle, is perforated with holes, to receive a pin, by which the lever may be held at any required position. The plough or harrow is suspended from arms, F'', on the front end of the lever, by two chains, G, on each side of the tongue. These chains are attached to other chains, H H, fastened to each side of the beam of the plough or harrow, in such manner that the plough or harrow shall be balanced thereon. Lateral chains, H' H', are fastened to each side of the beam, and carried up and hooked to the front part of the frame, for the purpose of keeping the plough or harrow in line with the tongue. I is a plough of any kind, and K is a harrow. The plough may be directed by the driver, by means of the handles L L, which extend upwards on each side of the seat. M is a bail, for the purpose of directing the harrow. The lever may be used for raising up the plough or harrow. The depth of the cut will be regulated by increasing or diminishing the length of the chains G.

What I claim as my invention, and desire to secure by Letters Patent, is—

1. Broadly attaching the same draught to both the plough-beams and carriage, by divided tugs, in such manner that each draught is independent of the other, as herein specified.

2. The combination of the frame A, supported upon wheels B, the driver's seat E, and lever F and chains G and H, for suspending adjustably, a plough or harrow, substantially in the manner set forth.

3. The combination of the chains G and H, for suspending the plough or harrow, and lateral chains H', attached to the frame, substantially as and for the purpose set forth.

In testimony whereof, I have signed my name to this specification in the presence of two subscribing witnesses.

C. N. BAKEWELL.

Witnesses:
D. P. HOLLOWAY,
JOHN D. BLOOR.